Patented Sept. 12, 1933

1,926,744

UNITED STATES PATENT OFFICE 1,926,744

PROCESS FOR EXTRACTING ALUMINA

Robert F. James, Detroit, Mich., assignor to The Detroit Edison Company, Detroit, Mich., a corporation of New York No Drawing. Application November 4, 1929
Serial No. 404,870

6 Claims. (Cl. 23—142)

The invention relates to a process for the extraction of alumina from intimate mixtures or chemical compounds of alumina and silica.

The primary object of the invention is to improve upon processes heretofore used in the extraction of alumina and to obtain methods which are simpler to carry out and more advantageous from an economic standpoint. While my process is applicable for the extraction of alumina from various compounds of mixtures, it has particular utility in reclaiming alumina from coal ash in such form that the alumina can be subsequently treated by known commercial methods for the production of metallic aluminum. A typical analysis of coal ash to which my process is applicable is as follows:

|  | Per cent |
|---|---|
| Silica $SiO_3$ | 40–60 |
| Iron oxide $Fe_2O_3$ | 10–20 |
| Alumina $Al_2O_3$ | 18–40 |
| Titanium oxide $TiO_2$ | ½–2 |
| Calcium oxide $CaO$ | 1 |
| Magnesium oxide $MgO$ | 1 |
| Sulphates $SO_4$ | 1 |
| Arsenates $As_2O_3$ | 1 |
| Phosphates $P_2O_5$ | 1 |

Ash having this composition is most generally to be found in the waste piles from pulverized coal power plants which burn pulverized or powdered coal in suspension and collect the ash from the flue or stack gases by well known means such, for example, as magnetic separators. Such ash is known to the trade as "fly ash".

My process consists essentially in mixing the alumina-silica compound or mixture with certain predetermined amounts of two other substances, one of which is a compound of an alkali metal such as sodium oxide, potassium carbonate, etc., and another of which is a compound of an alkali earth metal such as calcium oxide, magnesium carbonate, etc. The proportions of the various ingredients of this mixture are important and it is desirable to render the alumina in such a form that it may readily be leached out while maintaining the silica in a form insoluble in the leaching material used so that an effective separation may be obtained. Therefore the amount of the alkali metal compound must bear not less than a certain ratio to the amount of alumina present for two principal reasons, first, to facilitate the decomposition of the initial silicates and second to maintain a sufficiently high alkalinity for the subsequent precipitation of the alumina after it has been removed by the leach. The compound of the alkali earth metal is added to the mixture in order to form a chemical combination with the silica present in the initial mixture but the amount of the alkali earth metal compound must be maintained below a certain ratio in order to permit the use of lower temperatures in the subsequent heat treatment and also to keep the gross tonnage of the mixture to be leached as low as possible.

The amount of the compound of the alkali metal added must be kept down to as low an amount as possible consistent with the requirements heretofore set forth in order to prevent the destruction of the fire brick lining of the furnace in which the heat treatment is carried out.

While the exact ratios of the various ingredients may be varied under different operating conditions, it is preferable to maintain the ratio of the alkali metal compound and the alumina to not less than one and seventy-seven hundredths or more than two molecules of alkali metal compound to one molecule of alumina. It is also preferable to maintain the amounts of alkali earth metal compound and alumina in the ratio of not less than one or more than two molecules of the alkali earth metal compound to one molecule of silica.

The mixture in the proportions given above is subjected to a heat treatment and in the preferred process the mixture is sintered to a clinker at a temperature of from 1000° C. to 1200° C. The alkali metal present serves the purpose of lowering the temperature for clinkering and causing the disassociation of the alumina and silica with the formation of a chemical compound between the alumina and the alkali metal. The alkali earth metal in turn forms a chemical compound with the silica and prevents the silica from recombining with the alumina. Prior to the sintering operation the mixture is preferably finely ground and intimately mixed so that it may be subjected to the sintering operation in a standard type of rotary kiln such as is used in the cement industry. The high alkali metal content tends to cause the chemical disassociation of the aluminum silicate and acts as a flux to decrease the temperature required for clinkering.

After the sintering operation the clinker is cooled and then crushed for leaching. The leaching agent is preferably cold water and the alkali earth metal-silica compound being insoluble in water remains as a solid residue, whereas the alkali metal-alumina compound being water soluble is removed from the solid residue.

This solution resulting from the water leach is then treated with some means for the precipitation of the alumina and in the preferred process carbon dioxide is added which forms an insoluble compound of alumina and a water soluble compound of the alkali metal. The insoluble alumina compound is removed from the solution by filtration, purified by washing and dehydrated to alumina.

It is essential that an excess of the alkali metal be kept in order to maintain a relatively high alkalinity during the carbon dioxide precipitation in order to prevent a contamination of the alumina with such silica as was not combined with the alkali earth metal during sintering.

The phenomenon of the precipitation of aluminum hydroxide by carbon dioxide and the justification of the presence of excess alkali metal may be explained as follows: The solution from the leaching process is alkaline or, of a high pH value. The initial introduction of carbon dioxide causes the chemical transformation of alkali metal aluminate to alkali metal carbonate and aluminum carbonate. The ionization of alkali metal carbonate in aqueous solution supplies hydroxyl ions which combine with the aluminum ions to form the insoluble aluminum hydroxide and removing the OH ions, thus lowering the pH or acidifying the solution. As the solution pH lowers, such silica as is present, tends to precipitate and pollute the aluminum hydroxide. By maintaining an excess of alkali metal in the solution, the alkalinity is sustained and the silica remains in the solution as water soluble alkali metal silicate. The higher pH values prevent the alkali metal silicate from breaking down in the presence of carbon dioxide to alkali metal carbonate and the insoluble silica. In this manner, one source of silica contamination is eliminated.

The insoluble residue from the leaching operation may be further treated to yield a hydraulic cement or a fertilizer or may be otherwise used.

In place of the sintering operation as outlined above, an alternative procedure may be adopted in which the initial mixture including the additions of the alkali metals and the alkali earth metals to the alumina-silica compound or mixtures may be fused to fluidity and then subjected to electrolysis in order to remove the metallic oxide impurities lower in the electromotive series than alumina. After the removal of such metal impurities, the resulting slag, which contains the silica and the alumina, is leached in the same manner as outlined above, yielding a soluble alumina compound and an insoluble silica compound. The residue may then be further treated to make a hydraulic cement or a fertilizer. The electrolytic process results also in the formation of a metallic alloy containing silicon such as ferro-silicon.

The alumina obtained by either of the processes outlined above may be reduced to metallic aluminum by any known process such, for example, as the Hall process.

The process as above described is useful for obtaining alumina from alumina-silica compounds or mixtures and it is particularly adapted for the reclaiming of useful products from coal ash. When applied to a coal ash of the analysis given above, it is preferable to mix the ash with calcium oxide or calcium carbonate and further with sodium oxide or sodium carbonate since these materials are readily obtained at low cost.

In the broader aspects of the invention, however, it should be noted that the calcium oxide may be replaced by other alkali earth metal oxides or alkali earth metal carbonates. Thus, any of the alkali earth metals, calcium, strontium, magnesium or barium might be considered as chemical equivalents, though for economic reasons the calcium is preferred. It is also permissible to use certain other metallic oxides or metallic carbonates as the chemical equivalent of calcium oxide in this process and in general it may be said that the oxide of any metal which more readily combines with silica than with sodium may be used. For example, iron oxide or iron carbonate may be used in place of calcium oxide, or titanium oxide might also be used.

The alkali metal oxide or carbonate added is preferably the sodium compound for economic reasons, although the other alkali metals such as potassium and lithium must be considered as chemical equivalents in the process.

In the preferred process of treating coal ash of the analysis given above, it is mixed with either calcium oxide or calcium carbonate in the ratio of not less than one or not more than two molecules of calcium oxide to one molecule of silica and further mixed with either sodium oxide or sodium carbonate in the ratio of not less than 1.76 molecules or more than two molecules of the sodium oxide to one molecule of alumina. The mixture is finely ground, intimately mixed and clinkered in a standard type of rotary kiln such as is used in the cement industry and the temperature is maintained from 1000° to 1200° C.

The flue gas is cleaned by Cottrell precipitators, the precipitate being returned to the kiln. The exhaust heat may be used for the preliminary drying of the by-product materials. Since the exhaust gas is practically all carbon dioxide, it is compressed by a standard air compressor and used for the precipitation of aluminum hydroxide from the sodium aluminate.

Upon discharge from the kiln, the clinker is spray cooled with water, and finely crushed in water. The water present in the crushing stage acts as a leach and removes the water soluble sodium aluminate and excess sodium oxide as an aqueous solution of sodium aluminate and sodium hydroxide and leaving as a residue the water insoluble calcium silicates and metallic compounds.

The sodium aluminate, sodium hydroxide solution is next intimately mixed with carbon dioxide. This is accomplished either by spraying the solution as a mist into a chamber filled with carbon dioxide or by violent mixture due to pressure of gas and agitation of the solution. In either case, aluminum hydroxide is precipitated in a powdered or crystalloid form. The crystalloid is filtered and dehydrated with relative ease to alumina exceeding 99% purity.

The residue from the leaching, containing the calcium silicates and insoluble metallic compounds are mixed with additional quantities of calcium to form the tri-calcium silicate, sintered, and ground. This material is mixed with gypsum to form Portland cement.

The aluminum hydroxide is calcined to drive off both the mechanically entrained and chemically combined water. The resulting alumina ($Al_2O_3$) will be in excess of 99% pure and may be reduced by the Hall process to metallic aluminum. Thus, "off peak" power is utilized to produce readily marketable products from waste material.

As an alternate process, the mixture instead of being sintered to a clinker, is reduced to a slag and subjected to a direct current which causes electrolysis of the molten slag with subsequent electrodeposition of the metals. Sufficient time is permitted for removal of all metals lower in the electromotive series than aluminum. By the use of this method, metallic alloys containing silicon are obtained. The resulting slag is cooled, crushed, and leached as before described for the removal of alumina. The final remaining slag may be further treated to make a hydraulic cement or fertilizer.

There are numerous advantages of my process as hereinbefore set forth, among which are the following:

1. This process permits the use of both high silica and high iron containing aluminous materials.

2. This process permits the use of strong sodium concentration and thus facilitates the reaction between the sodium and the aluminum silicates. The stronger sodium concentration also permits a wider range of precipitation operation and a faster sodium regeneration without the additional cost of concentration of sodium solutions.

3. The increased sodium concentration and decreased calcium concentration permit the use of lower kiln temperatures and increase the ratio of water soluble clinker thus lowering the gross tonnage to be handled and the unit cost of processing.

4. Delicate and precise precipitation operation is not necessary since the precipitation is initially due to pH concentration rather than mass action.

5. A more complete recovery of the aluminum hydroxide is permitted without consequent silica contamination.

6. Less time and space are required than with any other process since settling tanks and steam cookers are eliminated. The precipitation is most efficient at lower temperatures.

7. The precipitated aluminum hydroxide is in the crystalloid form and contains gas which, upon subsequent calcination yields an aluminum oxide in the form of porous, spongy pellets which are ideally suited to aluminum reduction.

8. The regeneration of reacting materials is coincidental to the maximum economic recovery of marketable products.

While in the above description I have described the process in its preferred embodiment, it is to be understood that various modifications may be made and the invention in its broader aspects is to be construed in the light of the claims appended hereto.

In the claims the term "silica-alumina mixtures" is used generically to define any mixture or chemical compound containing both silica and alumina whether united physically or chemically or both.

What I claim as my invention is:

1. The process of recovering aluminum from coal ash which comprises heating the coal ash in the presence of an alkali compound and an alkali earth compound in the ratio of over 1.76 molecules of alkali metal compound to one molecule of alumina in said ash and over one molecule and less than two molecules of alkali earth metal oxide in said alkali earth metal compound to one molecule of silica in said ash, leaching the product to extract therefrom sodium aluminate and excess alkali metal compound and adding to said alkaline solution carbon dioxide to precipitate a non-colloidal precipitate containing aluminum.

2. The process of recovering alumina from coal ash which comprises forming a furnace charge of coal ash with alkali metal compound and an alkali earth metal compound in the proportion of more than one and less than two molecules of alkali earth metal oxide in said alkali earth metal compound to one molecule of silica in said ash, sintering the mixture and dissolving the resulting alkali metal aluminate from the sinter.

3. The process of recovering alumina from a silica alumina mixture having high iron and high silica content which comprises forming a furnace charge of said silica alumina mixture with an alkali metal compound and an alkali earth metal compound in the proportion of more than one and less than two molecules of alkali earth metal oxide in said alkali earth metal compound to one molecule of silica in said silica alumina mixture, sintering the mixture and dissolving the resulting alkali metal aluminate from the sinter.

4. The process of recovering alumina from coal ash which comprises forming a furnace charge of coal ash with sodium carbonate and calcium carbonate, said calcium carbonate being present in the proportion of more than one and less than two molecules of calcium carbonate to one molecule of silica in said ash, sintering the mixture and dissolving the resulting alkali metal aluminate from the sinter.

5. The process of treating coal ash which comprises forming a furnace charge of coal ash with sodium carbonate and calcium carbonate, said calcium carbonate being present in the proportion of more than one and less than two molecules of calcium carbonate to one molecule of silica in said ash, sintering the mixture and dissolving the resulting alkali metal aluminate from the sinter.

6. The process of treating coal ash which comprises forming a furnace charge of coal ash with an alkali metal compound and a compound of a metal oxide which combines more readily with silica than said alkali metal to form an insoluble residue, the ratio of metal oxide in said metal compound to the silica in said charge being in the proportion of more than one and less than two molecules of metal oxide to one molecule of silica, heating the mixture to a temperature at least as high as that of incipient fusion, thereby forming a clinker and removing the alkali metal aluminate from said clinker.

ROBERT F. JAMES.